Figure 1:
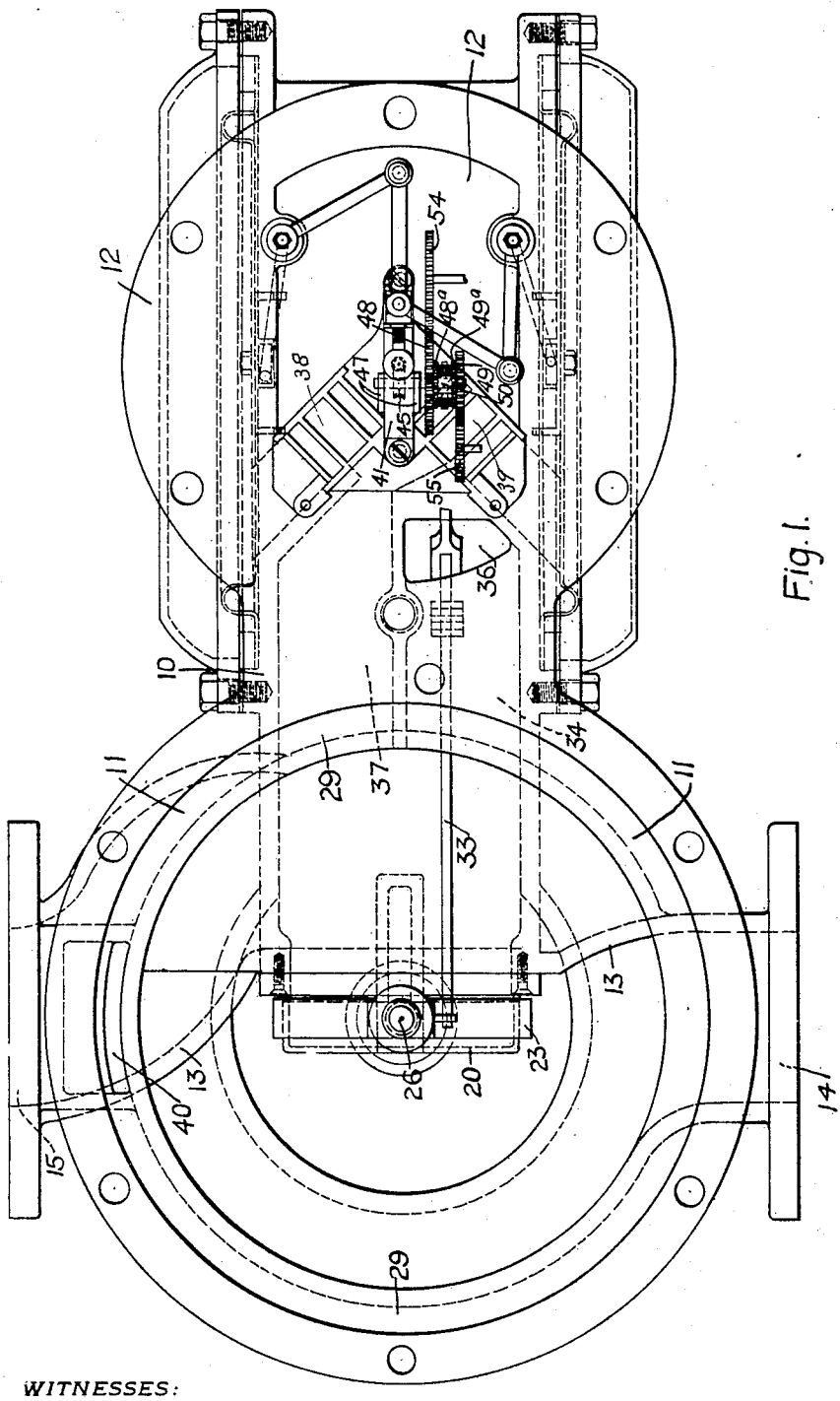

H. CHRISMAN.
FLUID METER.
APPLICATION FILED DEC. 7, 1910.

1,198,617.

Patented Sept. 19, 1916.
4 SHEETS—SHEET 1.

WITNESSES:

INVENTOR.

BY

HIS ATTORNEY IN FACT.

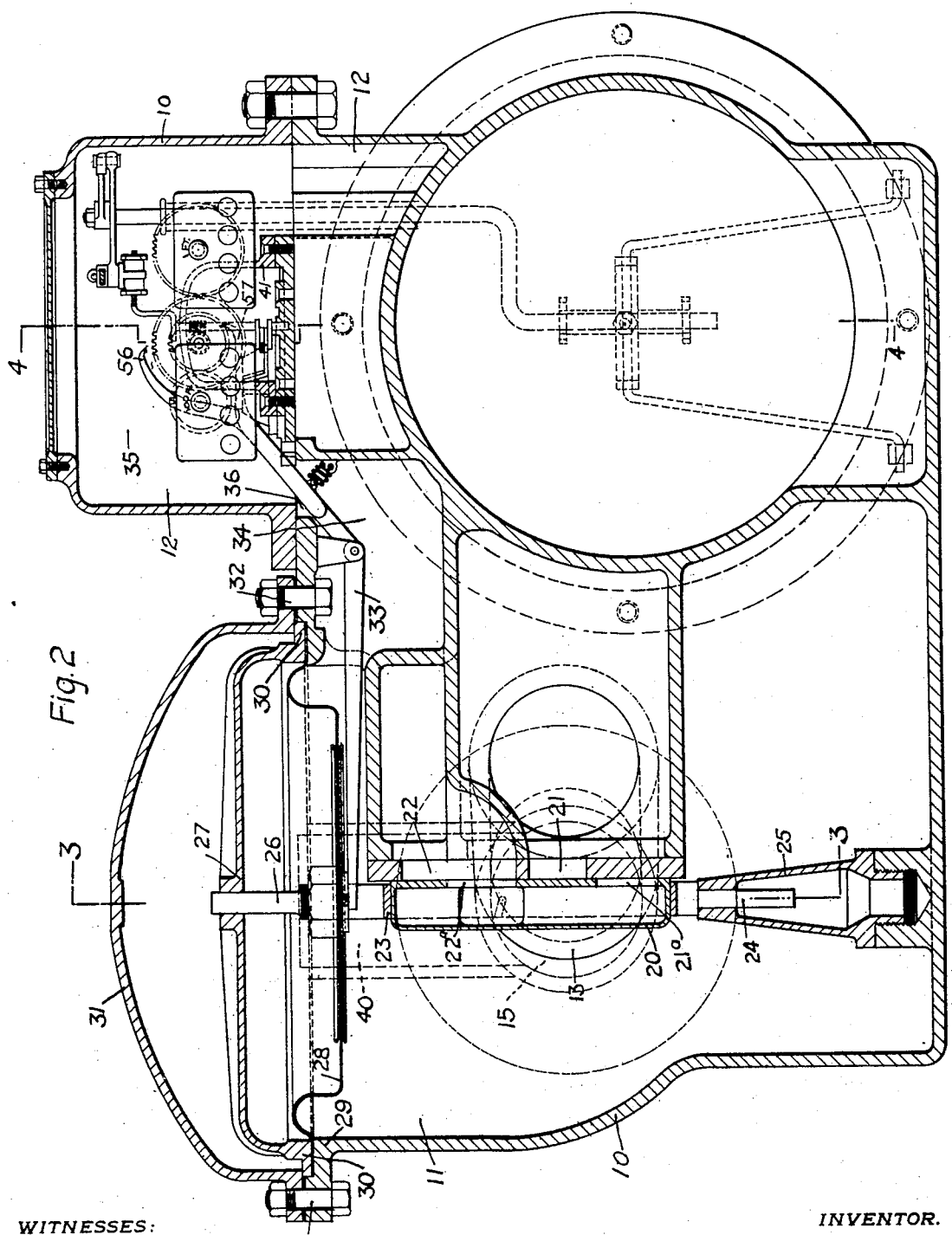

H. CHRISMAN.
FLUID METER.
APPLICATION FILED DEC. 7, 1910.

1,198,617.

Patented Sept. 19, 1916.
4 SHEETS—SHEET 3.

WITNESSES:

INVENTOR.

BY

HIS ATTORNEY IN FACT.

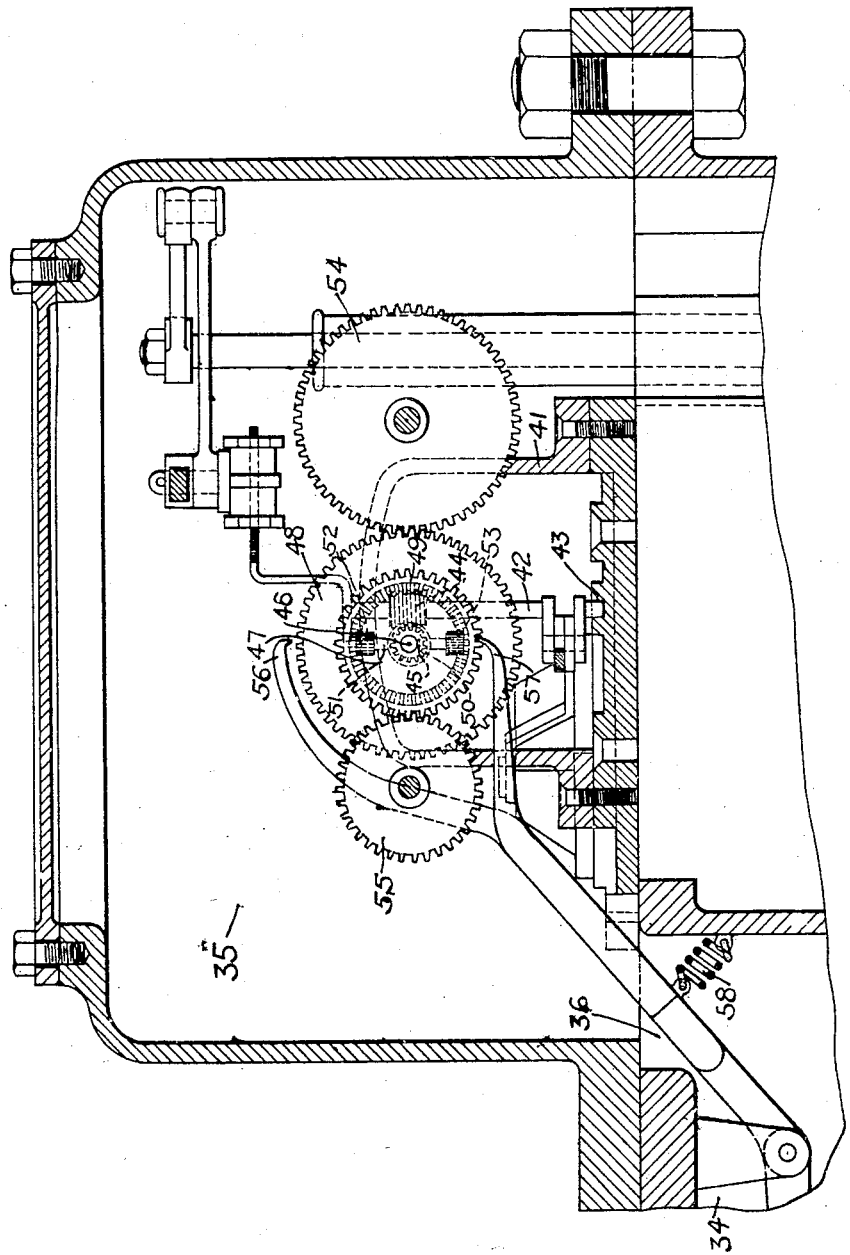

UNITED STATES PATENT OFFICE.

HORACE CHRISMAN, OF EDGEWOOD PARK, PENNSYLVANIA, ASSIGNOR TO PITTSBURGH METER COMPANY, A CORPORATION OF PENNSYLVANIA.

FLUID-METER.

1,198,617.   Specification of Letters Patent.   Patented Sept. 19, 1916.

Application filed December 7, 1910.   Serial No. 596,013.

*To all whom it may concern:*

Be it known that I, HORACE CHRISMAN, a citizen of the United States, and a resident of Edgewood Park, in the county of Allegheny and State of Pennsylvania, have made a new and useful Invention in Fluid-Meters, of which the following is a specification.

This invention relates to meters and one object thereof is to provide a proportional meter that will measure the entire volume of small flows and measure a fixed percentage of the volume of fluid passing during large flows.

Another object of the invention is to provide means whereby both the small flows and large flows may be measured by one tally meter.

According to my invention, I may accomplish the above objects by providing a main valve adapted to be operated by a pressure actuated device (shown in the drawings as a diaphragm) which is located between the inlet and outlet chambers and actuated by the difference of pressure in these chambers. When the difference is slight the diaphragm in the device shown remains in its lowermost position due to gravity, and certain ports in the valve, direct the whole volume from the tally meter, which by means of a pressure actuated device and an indicator actuating means (shown as a differential gear) permits the tally to operate the small volume register, indicating the whole volume passed. When, however, the difference of pressure across the diaphragm has become sufficient to overcome the weight of the moving parts, the valve is raised and directs a small portion of the gas from the tally to the outlet while the balance goes direct through ports in the valve to the outlet. It will be noticed that the raising of the diaphragm causes the pressure actuated device to release a member of the differential gear and engage another member, thus allowing the tally to operate the large volume register, which, as well as the small volume register, indicates the whole amount passed.

Figure 4:
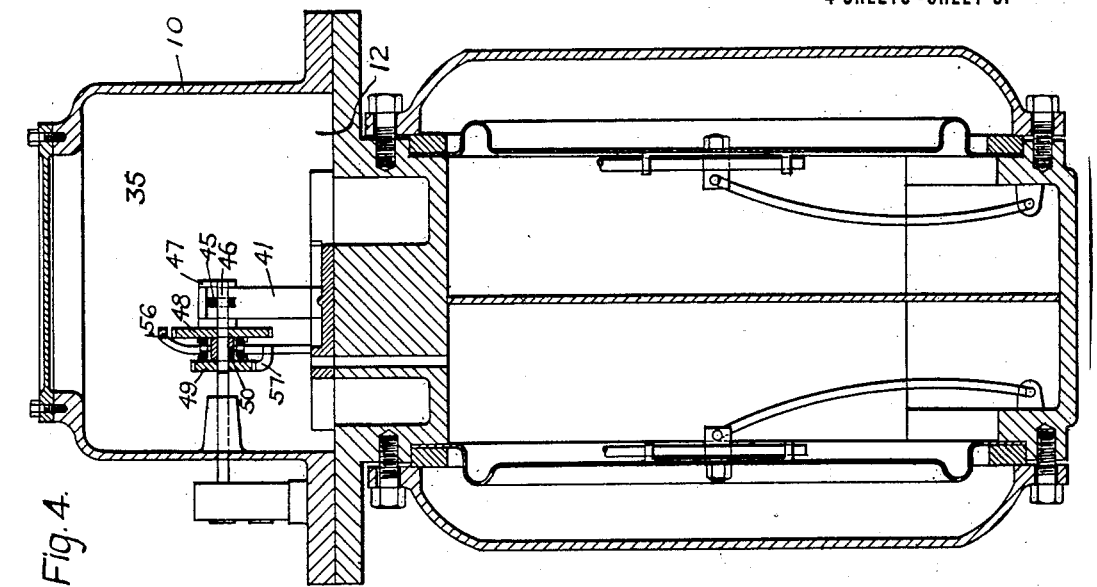
Figure 3:
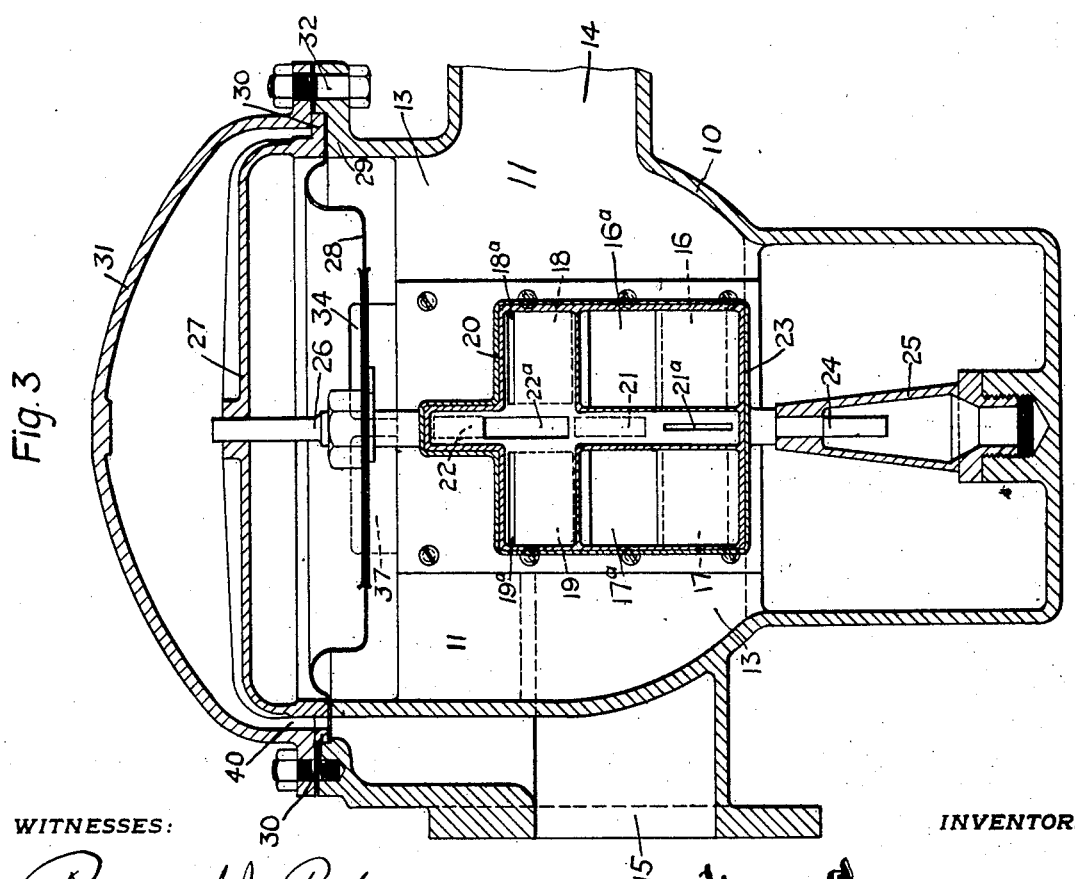

Figure 1 is a plan view of the meter with the top covers removed. Fig. 2 is a vertical longitudinal sectional view through a meter constructed in accordance with my invention. Fig. 3 is a sectional view on the line 3—3 of Fig. 2. Fig. 4 is a sectional view on the line 4—4 of Fig. 2, and Fig. 5 is an enlarged view of the registering mechanism.

10 designates a casing comprising two separate chambers, a distributing chamber 11 and a meter chamber 12. The distributing chamber is divided by a partition 13 separating the inlet 14 from the outlet 15. The partition 13 is provided with suitable ports 16, 17, 18 and 19 to register with ports $16^a$, $17^a$, $18^a$ and $19^a$ in a slide valve 20. The partition is also provided with ports 21 and 22 to register with ports $21^a$ and $22^a$ in the slide valve 20. The slide valve 20 is carried in a frame 23 provided with a guide stem 24 at one end movable in a guide bearing 25 in the chamber 10. The other end of the frame is provided with a stem 26 guided in a spider or guide 27 in the chamber 11 and connected to a diaphragm 28. The diaphragm 28 rests upon a shoulder or flange 29 and is interposed between said flange and a flange 30 of the spider 27. A cover 31 is shown as being secured to the chamber 10 by suitable fastening devices illustrated as bolts 32. The diaphragm is also connected to a pawl and ratchet mechanism to be hereinafter described and of which the lever 33 forms a part. The chamber 11 communicates with the chamber 12 through a port 34 communicating with the valve mechanism in the sub-chamber 35 through a port 36. From the chamber 12 the gas may pass through a port 37 to the openings 38 and 39 in the partition 13 (if the gas is flowing under normal flows) and after passing through the hollow valve 20 may pass out through the exhaust 15. The diaphragm will practically be balanced by the gas which enters through the port 40 before the diaphragm 28, so that the pressures will be practically equal, and when low flows are passing through the chamber 11 the valve will be practically in a position shown in Figs. 2 and 3 but should a heavy demand come upon the distributing chamber 11 the exhaust gas from one side (in this case the upper side) of the diaphragm, due to differences in pressure, will raise the diaphragm 28 and carrying with it the valve, will permit part of the gas to pass direct through the outlet while a proportion of the gas will pass through the chamber 12 carrying the meter mechanism. During low flows, gas enters the inlet 14 passing under the diaphragm 28 through the port 36 to the chamber 35, then through valve ports 38 and 39 through the port 37 to the port 22 through port 22ᵃ through port 19ᵃ and through the outlet 15. During high flows, the gas enters the inlet 14, passes under the diaphragm 28, through the port 36 to the chamber 35, then through the valve ports 38 and 39 of the tally meter through 37 to port 22, through port 22 and 22ᵃ and through port 21ᵃ into the outlet 15.

As heretofore stated the meter mechanism in the subchamber 35 is substantially the same as in any ordinary meter, the difference being that a specially constructed registering mechanism is provided. This mechanism is best illustrated in Figs. 1 and 5. 41 is a yoke or frame in which is journaled a crank shaft 42, said shaft 42 also being journaled in the step bearing 43 in the floor of the subchamber 35. To the crank of the shaft 42 are connected the usual valve operating links and said shaft is provided with a worm gear 44 meshing with a pinion 45 on horizontal shaft 46 mounted in suitable bearings 47 carried by said yoke 41. The shaft 46 is provided with a differential gear comprising two gears 48 and 49 having crown teeth 48ᵃ and 49ᵃ on their inner faces. The gears 48 and 49 are loose on the shaft 46 but a sleeve 50 interposed between them is fast on the shaft 46 and this sleeve carries a pinion shaft 51 on which are pinions 52 and 53 meshing with the teeth 48ᵃ and 49ᵃ of the gears 48 and 49. The gear 48 meshes with a gear 54 which operates the low flow indicator and the gear 49 meshes with a gear 55 which operates the high or proportional flow. It is one of the purposes of this invention to prevent operation of the high flow mechanism when low flow mechanism is being operated and vice versa. As heretofore indicated, this may be accomplished by the position of the diaphragm 28 which operates the lever 33. The lever 33 is provided with a double pawl having pawl teeth 56 and 57. The tooth 56 is adapted to engage the toothed wheel 48 when the diaphragm is raised so that the low flow mechanism will be cut off and at the same time the tooth 57 will release the toothed wheel 49 and permit the high flow mechanism to register. If the diaphragm 28 is down during low flows the tooth 56 will move out of engagement with the wheel 48, but the tooth 57 will move into engagement with the tooth 49ᵃ so that the low flow mechanism will register but the high flow mechanism will be held against movement. The lever 33 is provided with a spring 58 to normally hold said lever in proper operative position. By such a construction as indicated in the foregoing description the entire casing 10, that is, the body portion thereof, may be cast in one piece. Heretofore where proportional and tally meters have been employed they have generally been made in separate castings. By making the entire device of one casting, however, the likelihood of leakage between the proportional and tally meter will be avoided. It will also be observed that access may readily be had to the interior of the meter for the purpose of repair or inspection and that the device is capable of measuring the entire volume during light flows and only a proportion of the volume consumed during heavy flows. Furthermore, a single operating mechanism is provided for controlling the effective operation of either the high flow indicating mechanism or the low flow indicating mechanism.

Having thus described my invention, what I claim is:

1. In a meter, means for registering high rates of flow and means for registering low rates of flow, a single operating mechanism for holding one means inoperative when the other is operating, said mechanism including a diaphragm and a lever.

2. In a meter, means for registering high rates of flow, means for registering low rates of flow, means for holding one means inoperative when the other is operating, said last named means being actuated by differences in pressure within the meter.

3. In a meter, a high rate flow registering mechanism, a low rate flow registering mechanism, means for operating both mechanisms, a fluid pressure diaphragm, and means connected to the diaphragm, for holding one of said first named means inoperative when the other is operating.

4. In a meter, a distributing chamber, a measuring chamber, a differential indicating mechanism coöperating with the measuring chamber, a valve for controlling exit of fluid from the measuring chamber and a diaphragm for operating said valve.

5. In a meter, a compartment provided with an inlet and an outlet, a measuring chamber communicating with the compartment, a valve, and means connected to said valve to render it movable to one position to establish communication, both between the inlet and the outlet and the measuring chamber and the outlet, and movable to another position to establish communication between the measuring chamber and the outlet only.

6. In a meter, a compartment provided with an inlet and an outlet, a measuring chamber communicating with the compartment, a valve at the outlet side of the measuring chamber, and means connected to the valve to render it movable to one position to establish communication, both between the inlet and the outlet and the measuring chamber and the outlet, and movable to another position to establish communication between the measuring chamber and the outlet only.

7. In combination in a meter, separate means for registering high and low rates of flow, a single actuating mechanism for operating both means, a valve for directing fluid flows through the meter, and means responsive to variations in fluid pressure within the meter for rendering one or the other of said means operative.

8. In combination in a meter, a casing having an inlet and an outlet port for fluid, a valve for controlling direct communication between said ports, separate devices for indicating high and low rates of flow through said meter, a single actuating mechanism for actuating both means, and pressure responsive means for controlling the operation of said valve and for rendering one or the other of said means operative.

9. In a casing having a fluid inlet and a fluid outlet port, a measuring chamber, a valve for controlling direct communication between the inlet and the outlet ports and for controlling communication between said measuring chamber and said outlet port, separate registering mechanisms for registering the fluid flow through the meter when said ports are in direct communication and when direct communication between said ports is shut off, a meter actuated agent for actuating one or the other of said mechanisms, and means responsive to variations in fluid pressure occasioned by variations in flow through the meter for rendering one means operative and the other inoperative and for controlling the operation of said valve.

10. In a meter, a compartment provided with an inlet and an outlet port, a measuring chamber communicating with the compartment, a valve movable to one position to establish direct communication between the inlet and the outlet ports and communication between the measuring chamber and the outlet port, and movable to another position to establish communication between the measuring chamber and the outlet port and to cut off communication between the inlet and the outlet ports, separate devices for indicating the flow of fluid through the meter, a single meter actuated agent for actuating both of said devices, and flow responsive means for controlling the operation of said valve and both of said devices.

11. In combination in a meter, separate devices for indicating high and low rates of flow through the meter, a single fluid actuated agent for operating both devices, a compartment having fluid inlet and fluid outlet ports for the meter, a valve for controlling direct communication between the ports and for by-passing a portion of the fluid through the measuring chamber of the meter, and flow responsive means for controlling the operation of said valve and for rendering one or the other of said devices inoperative.

12. In combination in a meter, a casing having an inlet, an outlet, and a measuring chamber, a valve for controlling the delivery of fluid from the measuring chamber through the outlet port, a registering device for indicating the flow of fluid through the measuring chamber, means for controlling the operation of said registering device, and a flow responsive mechanism for controlling the operation of said means and of said valve.

13. In combination in a meter, a casing having a fluid inlet port, a fluid outlet port, and a measuring chamber in direct communication with the inlet port, a device for registering high rates of flow through the meter, a device for registering low rates of flow through the meter, means for actuating said devices, a valve for directing fluid from the measuring chamber during the high rates of flow, and pressure responsive means for controlling the operation of said registering devices and of said valve.

14. In combination in a fluid meter, a device for indicating low rates of flow through the meter, a device for indicating high rates of flow through the meter, meter-driven means for actuating said devices, and a pressure responsive mechanism for controlling the operation of both of said devices and for directing the flow of fluid through the meter.

15. In combination in a fluid meter, a mechanism for registering low rates of flow, a mechanism for registering high rates of flow, a meter driven shaft, a differential gearing driven by said shaft for driving both mechanisms, a valve for controlling the delivery of fluid through the meter, a diaphragm responsive to the pressure of the fluid passing through the meter for controlling the operation of said valve, and means actuated by said diaphragm for controlling the operation of said differential gear and for rendering one mechanism operative and the other inoperative.

In testimony whereof, I have hereunto subscribed my name this 2nd day of December, 1910.

HORACE CHRISMAN.

Witnesses:
 FLORENCE KITT,
 R. M. FERO.